United States Patent
Keating et al.

(10) Patent No.: US 9,160,182 B2
(45) Date of Patent: Oct. 13, 2015

(54) WIRELESS POWER CHARGING TIMING AND CHARGING CONTROL

(71) Applicant: QUALCOMM Incorporated, San Diego, CA (US)

(72) Inventors: Virginia Walker Keating, San Diego, CA (US); Miles Alexander Lyell Kirby, Ascot Berkshire (GB); Michael John Mangan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/302,233

(22) Filed: Jun. 11, 2014

(65) Prior Publication Data

US 2014/0292269 A1 Oct. 2, 2014

Related U.S. Application Data

(63) Continuation of application No. 12/609,809, filed on Oct. 30, 2009, now Pat. No. 8,760,113.

(60) Provisional application No. 61/155,065, filed on Feb. 24, 2009.

(51) Int. Cl.
    *H02J 7/00* (2006.01)
    *H02J 7/04* (2006.01)
    (Continued)

(52) U.S. Cl.
    CPC ............... *H02J 7/0027* (2013.01); *H02J 7/02* (2013.01); *H02J 7/025* (2013.01); *H02J 17/00* (2013.01)

(58) Field of Classification Search
    CPC ........................................ H02J 7/0027

USPC ................... 320/108, 155; 455/41.1
See application file for complete search history.

(56) References Cited

U.S. PATENT DOCUMENTS 5,467,006 A    11/1995  Sims
7,956,570 B2 *  6/2011  Lowenthal et al. ........... 320/104
(Continued)

FOREIGN PATENT DOCUMENTS

CN    200939099 Y    8/2007
CN    101174774 A    5/2008
(Continued)

OTHER PUBLICATIONS

International Search Report and Written Opinion—PCT/US2010/025287—International Search Authority, European Patent Office,Jan. 5, 2011.

*Primary Examiner* — Richard V Muralidar
(74) *Attorney, Agent, or Firm* — Knobbe Martens Olson & Bear LLP

(57) ABSTRACT

Exemplary embodiments are directed to timing and control of wireless power transfer. A wireless power charging device includes at least one transmitter and a processor in communication with the at least one transmitter. The transmitter is configured for transmitting wireless power to one or more electronic devices, and the processor is configured to deactivate the transmitter during a pre-determined time interval. The charging device may include charging modes that a user may select between from an interface of the charging device. Charging modes may be related to times of operation such as those based on a user schedule, based on energy rates, or with modes programmed by a user. A charging schedule may be created by a user through the interface of the charging device or from an external device in communication with the charging device.

17 Claims, 7 Drawing Sheets

(51) Int. Cl.
  *H04B 5/00* (2006.01)
  *H02J 7/02* (2006.01)
  *H02J 17/00* (2006.01)

(56) References Cited

U.S. PATENT DOCUMENTS

| | | | |
|---|---|---|---|
| 7,960,944 B2 * | 6/2011 | Hoffman et al. | 320/107 |
| 8,111,042 B2 | 2/2012 | Bennett | |
| 8,427,330 B2 | 4/2013 | Vorenkamp et al. | |
| 8,760,113 B2 * | 6/2014 | Keating et al. | 320/108 |
| 9,041,356 B2 * | 5/2015 | Matsumura et al. | 320/134 |
| 2008/0258679 A1 | 10/2008 | Manico et al. | |
| 2010/0090524 A1 | 4/2010 | Obayashi | |
| 2010/0213895 A1 | 8/2010 | Keating et al. | |

FOREIGN PATENT DOCUMENTS

| | | |
|---|---|---|
| GB | 2273614 A | 6/1994 |
| JP | 60225404 A | 11/1985 |
| JP | H06225404 A | 8/1994 |
| JP | 11069656 A | 3/1999 |
| JP | 2000116023 A | 4/2000 |
| JP | 2001143766 A | 5/2001 |
| JP | 2002233054 A | 8/2002 |
| JP | 2003224937 A | 8/2003 |
| JP | 2007295717 A | 11/2007 |
| JP | 2008141925 A | 6/2008 |
| JP | 2008289273 A | 11/2008 |
| JP | 2008301554 A | 12/2008 |
| WO | WO-2009065419 A1 | 5/2009 |

* cited by examiner

WIRELESS POWER CHARGING TIMING AND CHARGING CONTROL

RELATED APPLICATIONS

This application is a continuation of U.S. patent application Ser. No. 12/609,809 entitled "WIRELESS POWER CHARGING TIMING AND CHARGING CONTROL" filed Oct. 30, 2009, which claims the benefit of U.S. Provisional Patent No. 61/155,065 entitled "SMART TIMER WIRELESS CHARGING" filed Feb. 24, 2009, both of which are incorporated in their entirety by reference herein.

BACKGROUND

1. Field

The present invention relates generally to wireless charging, and more specifically to devices, systems, and methods related to wireless chargers.

2. Background

Typically, each battery powered device such as a wireless communication device (e.g. a cell-phone) requires its own charger and power source, which is usually the AC power outlet. This becomes unwieldy when many devices need charging, each requiring its own separate charger.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies the radiated power for charging the battery. Antennas are generally of resonant length in order to improve the coupling efficiency. This approach suffers from the fact that the power coupling falls off quickly with distance between the antennas, so charging over reasonable distances (e.g., less than 1 to 2 meters) becomes difficult. Additionally, because the transmitting system radiates plane waves, unintentional radiation may interfere with other systems if not properly controlled through filtering.

Other approaches to wireless energy transmission techniques are based on inductive coupling between a transmit antenna embedded, for example, in a "charging" device, mat, or surface and a receive antenna (plus a rectifying circuit) embedded in the host electronic device to be charged. This approach has the disadvantage that the spacing between transmit and receive antennas must be very close (e.g., within thousandths of meters). Though this approach does have the capability to simultaneously charge multiple devices in the same area, this area is typically very small and requires the user to accurately locate the devices to a specific area. In addition, it is desirable to control the timing of the transmission and performance of the charger according to user preferences.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. Those skilled in the art will appreciate that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

The approach described herein is applicable to variety of communication standards such as CDMA, WCDMA, OFDM, and the like. Those of ordinary skill in the art would understand that information and signals may be represented using any of a variety of different technologies and techniques. For example, data, instructions, commands, information, signals, bits, symbols, and chips that may be referenced throughout this detailed description may be represented by voltages, currents, electromagnetic waves, magnetic fields or particles, optical fields or particles, or any combination thereof.

Figure 1:
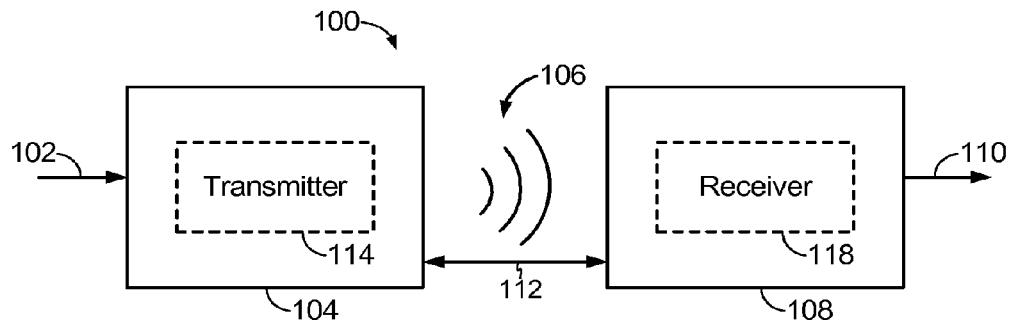
FIG. 1 illustrates a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far-field. When in the near-field, a coupling mode may be developed between the transmit antenna 114 and the receive antenna 118. The area around the antennas 114 and 118 where the near-field coupling may occur is referred to herein as a coupling-mode region.

Figure 2:
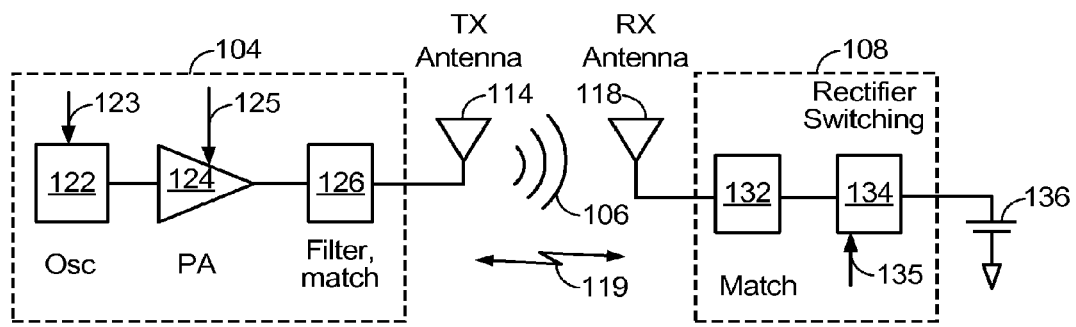
FIG. 2 illustrates a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
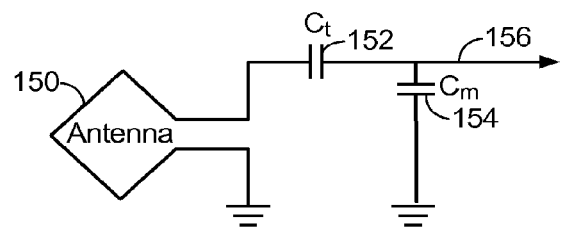
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems because magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna may be operated at a frequency that is low enough and with an antenna size that is large enough to achieve good coupling (e.g., >−4 dB) to a small Rx antenna at significantly larger distances than allowed by far-field and inductive approaches mentioned earlier. If the Tx antenna is sized correctly, high coupling levels (e.g., −2 to −4 dB) may be achieved when the Rx antenna on a host device is placed within a coupling-mode region (i.e., in the near-field) of the driven Tx loop antenna.

Figure 4:
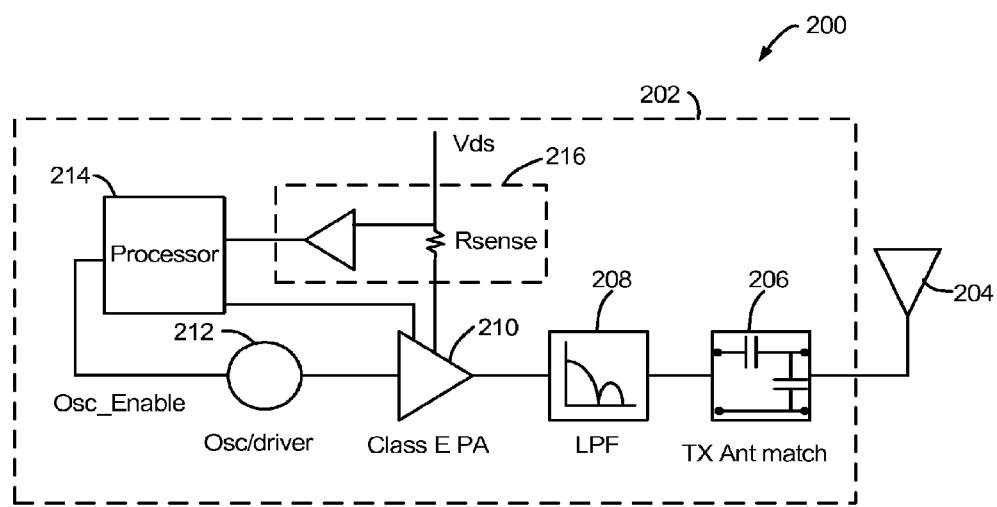
FIG. 4 is a simplified block diagram of a transmitter, in accordance with an exemplary embodiment of the present invention.

FIG. 4 is a simplified block diagram of a transmitter, in accordance with an exemplary embodiment of the present invention. A transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a processor 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers. As discussed later, processor 214 may also be configured to activate and deactivate the transmitter, or enable or disable the transmitter from generating a radiated field, during a pre-determined time interval, in response to at least one charging mode or according to a charging schedule.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by processor 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 may generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

In exemplary embodiments, one or more extra antennas may be used that couple to the transmit antenna and receive antenna in the system. These extra antennas comprise repeater antennas, such as active or passive antennas. A passive antenna may include simply the antenna loop and a capacitive element for tuning a resonant frequency of the antenna. An active element may include, in addition to the antenna loop and one or more tuning capacitors, an amplifier for increasing the strength of a repeated near-field radiation. However, generating constant radiation by the transmit antenna may not be desirable.

Exemplary embodiments of the inventions are directed to wireless chargers which use timing algorithms to determine the charger's performance and transmission of wireless power. These timing algorithms may control the charger according to user preferences. In other words, the charger may be configured to have a timing-based charging setting that is pre-programmable to automatically transmit wireless power during certain time intervals, and remain off during other time intervals based on the user's preferences.

For example, the user of a charger may wish to minimize the cost of operating the charger. Minimizing the cost of operating the charger may result from controlling the charger to operate at times based on energy rates, such as to operate only during off-peak energy hours. In an exemplary embodiment, a smart-wireless charger may be aware of real-time energy price information and may be configured to charge electronic devices only at off-peak or cheap energy times of the day. Such real-time information may be received from external devices. Alternatively, general off-peak times may be specified such that a charger may only be operated at pre-specified low cost times.

Additionally, the user of a charger may have safety concerns regarding human or animal exposure to electromagnetic radiation. Thus, the user may only wish the device to operate during specific times of the day when such exposure would be at a minimum. Examples of such times may include times where the user's family is asleep and likely a satisfactory distance from the charger, or at times when children may not be likely to play near the charger during the day-time. In such an exemplary embodiment the wireless charger may be configured to operate only at certain times of the day such as between the hours of 11:00 p.m. and 5:00 a.m. Another example may be that chargers in an office environment only operate during working hours. In such an example, the charger may be configured to transmit wireless power during work hours at office locations and to remain off during non work hours. Such pre-programmed timing modes may be stored within the charger for a user to select from. Timing modes may also exist for the user to program, and re-program according to the user's preferences.

Figure 5:
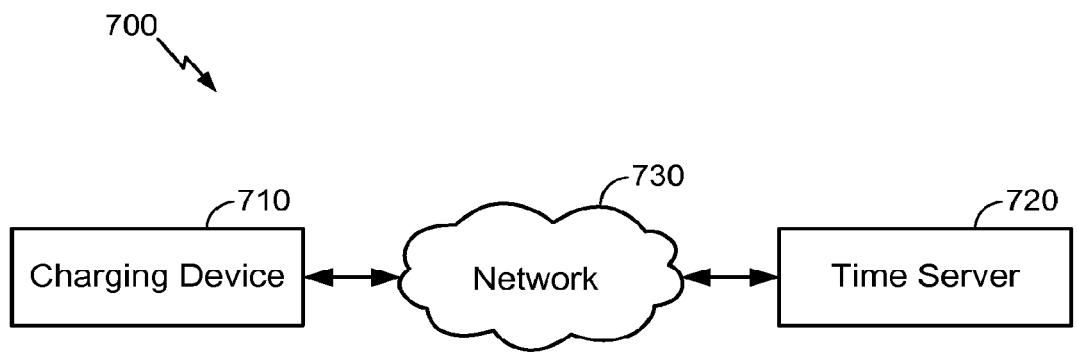
FIG. 5 illustrates a charger timing system for a charging device receiving time information according to an exemplary embodiment of the present invention.

FIG. 5 illustrates a charger timing system 700 for a charging device 710 receiving time information according to an exemplary embodiment of the present invention. Charging device may be in communication with an external device, such as a time server 720, and configured to receive time information from the time server 720. The connection between charging device 710 and time server 720 may be through any type of connection, including wireless, wired, fiber optic, or any combination thereof. Charging device 720 may be connected to time server 720 through a network 730 as shown in FIG. 5, or directly. An example of such a time server is a network time protocol (NTP) server.

In operation, charger timing system 700 may include charging device 710 in communication with a time server 720 to receive the time used by the processor of the charging device 710 to determine whether or not to have the charger device 710 transmit wireless power to an electronic device. If the time received by the charging device 710 is within a pre-determined acceptable time interval, wireless power may be transmitted. Charging device 710 may be configured to wirelessly charge at least one electronic device being positioned nearby. More specifically, charging device 710 may include at least one transmit antenna (e.g., transmit antenna 114 depicted in FIG. 2) configured to wirelessly transmit power to a receive antenna (e.g., receive antenna 118 depicted in FIG. 2) and an associated receiver (e.g., receiver 108 depicted in FIG. 2) coupled to a battery (e.g., battery 136 depicted in FIG. 2) of an electronic device positioned within nearby. Upon receipt of the wirelessly transmitted power at the receive antenna and the associated receiver, power may be supplied to the battery of the electronic device.

If the time received by the charging device 710 from the time server is not within a pre-determined acceptable time interval, wireless power may not be transmitted. In that case, a controller (e.g. processor 114 of FIG. 2) deactivates wireless power transmitting circuitry until the time falls within a pre-determined time interval.

Figure 6:
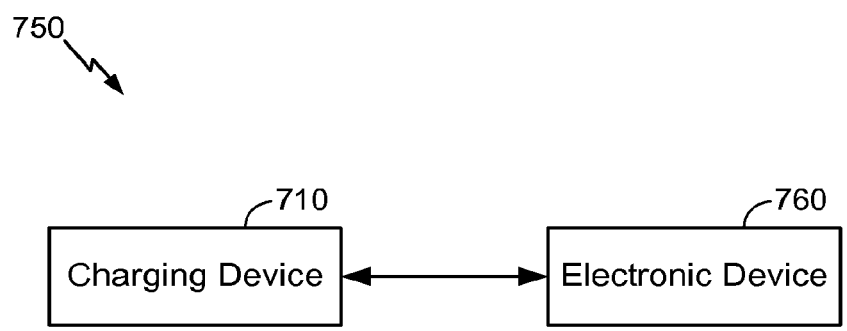
FIG. 6 illustrates a charger timing system for a charging device receiving timing information according to an exemplary embodiment of the present invention.

FIG. 6 illustrates a charger timing system 750 for a charging device 710 receiving timing information according to an exemplary embodiment of the present invention. Charging device 710 may be in communication with an external device, such as an electronic device 760, and configured to receive time information from the electronic device 760. The electronic device 760 may, for example, be a CDMA or GSM phone, or a personal digital assistant (PDA), although other electronic devices that keep or receive time information may be used. Electronic device 760 may be one of the same devices to which charging device 710 may eventually provide wireless power. The connection between charging device 710 may be through any type of connection, including a wireless connection such as Bluetooth, zigbee or other personal area network protocols.

In operation, charging device 710 may have a receiver for receiving time information from the electronic device 760. If the time received by the charging device 710 from the time server is not within a pre-determined acceptable time interval, wireless power may not be transmitted. In that case, a controller (e.g. processor 114 of FIG. 2) deactivates wireless power transmitting circuitry until the time falls within a pre-determined time interval.

In addition to receiving time information from the electronic device 760, charging device 710 may receive other information, such as a charging schedule from the electronic device 760. Such a charging schedule may be transmitted from the electronic device 760 to the charging device 710 in order to set a complete schedule of user-defined charging times, or set charging times for at least one charging modes of the charging device 710. Charging modes may additionally be transmitted from the charging device 710 to the electronic device 760 to be viewed and/or altered on an interface of electronic device 760. A charging schedule with information related to one or more charging time or charging mode of the charging device 710 may be communicated between electronic device 760 and charging device 710 through a small data file, such as an XML file. Other file types may alternatively be used.

Alternatively, or in combination with receiving time information from external devices, charging device 710 may keep time internally through an internal clock such as an oscillator. Although such an exemplary embodiment may experience some long term inaccuracy due to time drift, the degree of accuracy may be negligible to an average user. As will be discussed below with regard to an interface of the charging device 710, users may desire visual information regarding the current time and date on or near the charging device 710. The time source supplying such a visual time display may be repurposed to the processor to control the operability of the transmitter to transmit wireless power. Such an interface may allow the user to manually set or program the time, which may or may not represent the exact current time.

Figure 7:
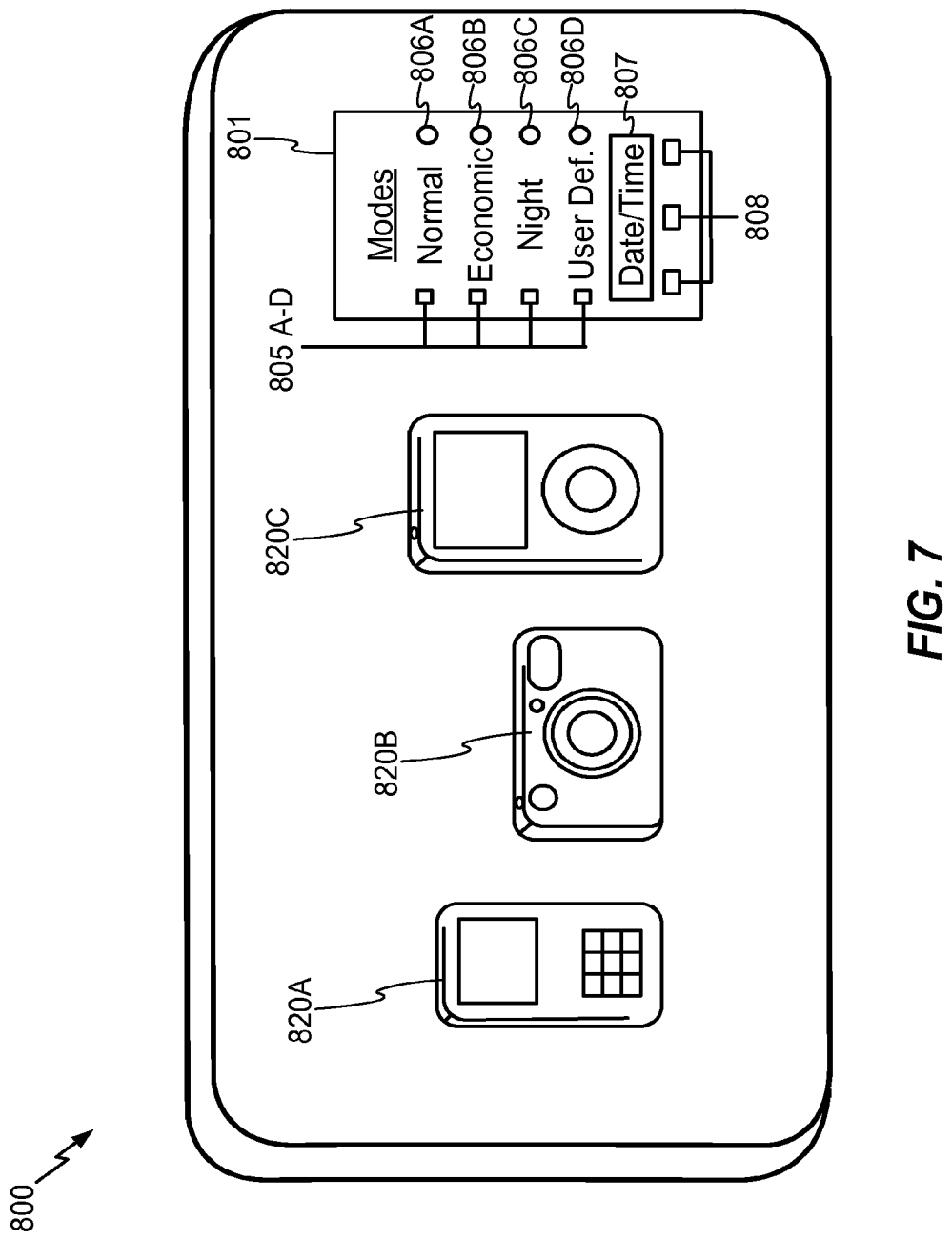
FIG. 7 illustrates a charging device according to an exemplary embodiment of the present invention.

FIG. 7 illustrates a charging device 800 according to an exemplary embodiment of the present invention. Charging device 800 may comprise any physical configuration which may enable one or more electronic devices to be placed within a charging region which comprises the radiated field generated by a wireless power transmitter. For example, charging device 800 may be configured in to have a substantially horizontal surface configured for one or more electronic devices to be placed thereon. Furthermore, charging device 800 may be implemented as a portable charging device (e.g., a bag) or a stationary charging device (e.g., a table).

Charging device 800 may include an interface 801 that is collocated or may be remotely located. Interface 801 includes a plurality of charging mode displays (i.e., charging mode display "normal", charging mode display "economic", charging mode display "night", charging mode display "user defined"), wherein each indicator display may be configured for conveying graphics, alphanumeric text, or any combination thereof. Specifically, each charging mode display may be configured to convey information relating a charging mode of charging device 800. Indicators 806A-D may be associated with individual modes to visually indicate the current charging mode under which the charging device 800 is operating. Indicators 806A-D may be implemented as LEDs or some other form of visual indicator. Additionally, interface 801 may include a display region 807 configured to display information such as a date and time. The date and time displayed may be obtained externally from or kept internally within the charging device 800 as previously discussed. Input region 808 may be configured to permit a user to manually change the date or time displayed by display region 807.

For example, charging mode display "normal" may be configured to display information relating to the charging mode of the charging device 402 being in normal operation. Normal operation may be considered to be transmitting continuously in either a high power charging state or a low power beacon state (see FIGS. 11A-D). Charging mode display "economic" may be configured to display information relating to a second charging mode, such as an economic based charging operation. An economic based charging operation may be considered to be based on real-time or historical off-peak charging times from a local energy supplier. Charging mode display "night" may be configured to display information relating to a third charging mode, such as a night time based charging operation. A night time based charging operation may be considered to be a time when people, especially children, are likely to be asleep. These first three exemplary modes may be pre-programmed as part of the charging device. Other pre-programmed modes may exist, such as, for example, work hour based charging, or school hour based charging. Pre-programmed modes may be adjusted to conform to individual circumstances of the user. Indicator display "user defined" may be configured to display information relating to a fourth charging mode, such as a user programmable charging operation. A user programmable mode may be considered to be based on any time schedule desired by a user. The time schedule for a user defined program mode may be set from inputs from interface 801 on the charging device 800 itself or communicated to charging device 800 from an external device as discussed above.

Interface 801 may include an input region 805 with functionality corresponding to each mode associated with each charging mode display. Input region 805 may be configured to permit the user to select between modes and set the mode according to user preferences. Thus, the charging modes of the transmitter may be interchangeable depending on the preferences of the user.

Interface 801 may also display or convey other information related to the charging modes of charging device 800. For example, if a user-defined mode is selected, then more information regarding that mode may be shown such as the time for transmission and times for non-transmission.

One skilled in the art will recognize that more or fewer modes may exist than the three illustrated by the interface 801 in FIG. 7. For example, pre-programmed modes may exist for economic-based charging based on local off-peak energy rates obtained by the charging device. Other pre-programmed modes may exist for time of day based charging based on times such as normal sleep times, business work hour times, school hour times, and so forth. New modes may also be created and programmable by a user. Multiple user-defined modes may be allocated such that a user may be able to program different modes and select between them without losing other user-programmed or pre-programmed modes. One or more modes may also have more than one time for non-transmission in that there may be several time intervals in a 24 hour period where transmission is disallowed. Programmability of a charging schedule may also allow for different hours being chosen depending on the day of the week, such as an example of choosing transmission to occur between 9:00 a.m. and 5:00 p.m. on Monday through Friday, but not at those same times on Saturday or Sunday when people are likely to be home spending more time near the transmitter. Different transmission times may be selected for those days if desired.

Furthermore, other modes such as rapid charge mode that indicated the device is charged after a certain acceptable percentage of charge. For example, various battery technologies require significantly more time to incrementally charge the battery as the battery approaches an entirely charged state. Therefore, a rapid charge mode would enable a device to be substantially charged without requiring the charger to continue applying charge during a less efficient charging portion of the process. Other modes may include adjusting the power level to higher and lower values depending on preferences to provide a quick charge of the battery or a slow charge by lowering the power level. Additional modes may also be individually selected for different devices that are being concurrently charged.

Furthermore, in addition to indicating which charging mode is selected, interface 801 may also indicate the current status of the transmitter. Such an indication may occur as part of a display, such as using one or more flashing lights to indicate whether the charger is transmitting and also whether one or more electronic devices positioned within an associated charging region is being charged. Furthermore, interface 801 may also be configured to indicate an amount of charge existing within an associated electronic device at a moment in time.

Furthermore, charging device 800 may be configured to audibly convey information related to the charging modes of the charging device. More specifically, for example, interface 801 may be configured to audibly convey a charging mode (e.g., economy-based, time of day-based, user-defined, etc.) or a change in charging mode status as a user makes such a change. Furthermore, interface 801 may be configured to audibly convey information indicative of whether the charging device is transmitting, or at a change in transmitting status. Interface 801 may also be configured to indicate whether a specific electronic device is being charged, an amount of charge existing within the specific electronic device at a moment in time, or any combination thereof.

Charging device 800 may also be configured to cause an electronic device to vibrate to indicate a charging mode, or a transition of charging mode of the charging device 800. As an example, charging device 800 may be configured to cause electronic devices 820 to vibrate to indicate that charging device 800 is now transmitting wireless power. For example, the current time may be 10:00 p.m. which may be the time that a user has defined as the beginning of the charging state. Further, charging device 800 may be configured to cause electronic devices 820 to vibrate at the transition from its charging state to a non-charging state, for example at 5:00 a.m. or a time at which a user has defined as the end of the charging device's 800 charging state. Naturally, other time intervals may exist for different charging modes such as economic-based, regular work hour-based, or any other user-defined based charging modes.

Although FIG. 7 illustrates interface 801 as having separate and distinct indicators and input regions, a more integrated interface may also exist. For example, a display screen may indicate information such as which modes exist and visually indicate which charging mode is currently selected. For example, the current mode selection may be communicated to a user through a visual indication next to the charging mode identifier, highlighting the charging mode identifier, and so forth. Additionally, a single input region to control selection, programming, and operation of the modes may exist. An input region incorporated with a display screen, such as a touch screen display, may exist to assist the user to navigate a menu to select, program, or operate the different charging modes. Information regarding the charging modes may be obtained through navigation of the interface 801.

Figure 8:
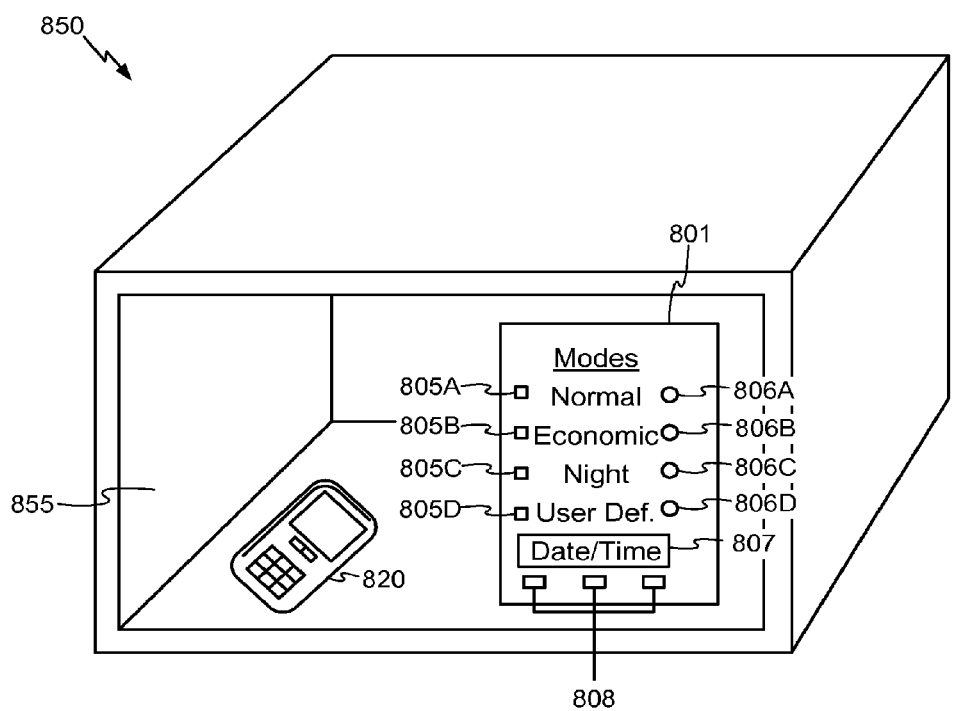
FIG. 8 illustrates another charging device having at least one interface, according to an exemplary embodiment of the present invention.

FIG. 8 illustrates another charging device 850 having at least one interface 801, according to an exemplary embodiment of the present invention. Charging device 850 may be configured to wirelessly charge at least one electronic device 820 being positioned within an internal region 855 of the charging device 850. More specifically, charging device 850 may include at least one transmit antenna (e.g., transmit antenna 114 depicted in FIG. 2) configured to wirelessly transmit power to a receive antenna (e.g., receive antenna 118 depicted in FIG. 2) and an associated receiver (e.g., receiver 108 depicted in FIG. 2) coupled to a battery (e.g., battery 136 depicted in FIG. 2) of an electronic device 820 positioned within internal region 850. Upon receipt of the wirelessly transmitted power at the receive antenna and the associated receiver, power may be supplied to the battery of the electronic device 820. Charging device 850 may be enabled or disabled from transmitting wireless power according to pre-determined time intervals, charging modes, or according to a pre-determined charging schedule.

As illustrated in FIG. 8, an interface 801 may be positioned on an exterior surface of charging device 850 and configured to convey graphics, alphanumeric text, or any combination thereof. Interface 801 may be configured to convey information relating to one or more charging modes of the charging devices as previously discussed and shown by FIG. 7.

Further, interface 801 of FIGS. 7 and 8 may further be configured to convey information related to a charging status of one or more electronic devices positioned within the charging region of the charging devices. For example, according to one exemplary embodiment, interface 801 may be configured to display one or more lights in display elements positioned proximate a device identifier (e.g., "Camera"), in a distinguishable pattern to indicate whether an associated electronic device 820 within the charging region of charging device is being charged. In addition, interface 801 may be configured to display one or more lights in another distinguishable pattern to indicate that an associated electronic device 820 within a charging region of charging device is fully charged. Furthermore, for example, interface 801 may be configured to display one or more continuous lights associated with a device identifier to indicate that the electronic device is fully charged.

Additionally, interface 801 may be configured to visually or audibly convey an identifier such as a device label (e.g., a user name), a device type (e.g., cell phone, camera, etc.), or any combination thereof. Additionally, interface 801 may be configured to audibly convey information indicative of whether an associated electronic device 820 positioned within a charging region of charging device is being charged or whether an associated electronic device 820 positioned within the charging region of charging device is fully charged. As a non-limiting example, if a camera is positioned within the charging region of charging device, interface 801 may be configured to visually audibly indentify the camera (e.g., audibly convey "camera") and visually or audibly convey a charging status of the camera (e.g., audibly convey "charged").

A charging device 800, 850 or a nearby device may include a repeater antenna, as described above, and, therefore, one or more electronic devices within may be charged via a charging device having a transmit antenna and the existence of a repeater antenna. Each charging device as described herein may be implemented as, for example only, a portable charging device such as a backpack, a briefcase, a purse, clothing, luggage, etc. Accordingly, a portable device with a repeater antenna may also include an interface, such as interface 801 as described herein. Furthermore, each charging device described herein may be implemented as, for example, a stationary charging device such as a table, a desk, or any other stationary furniture.

Figure 9:
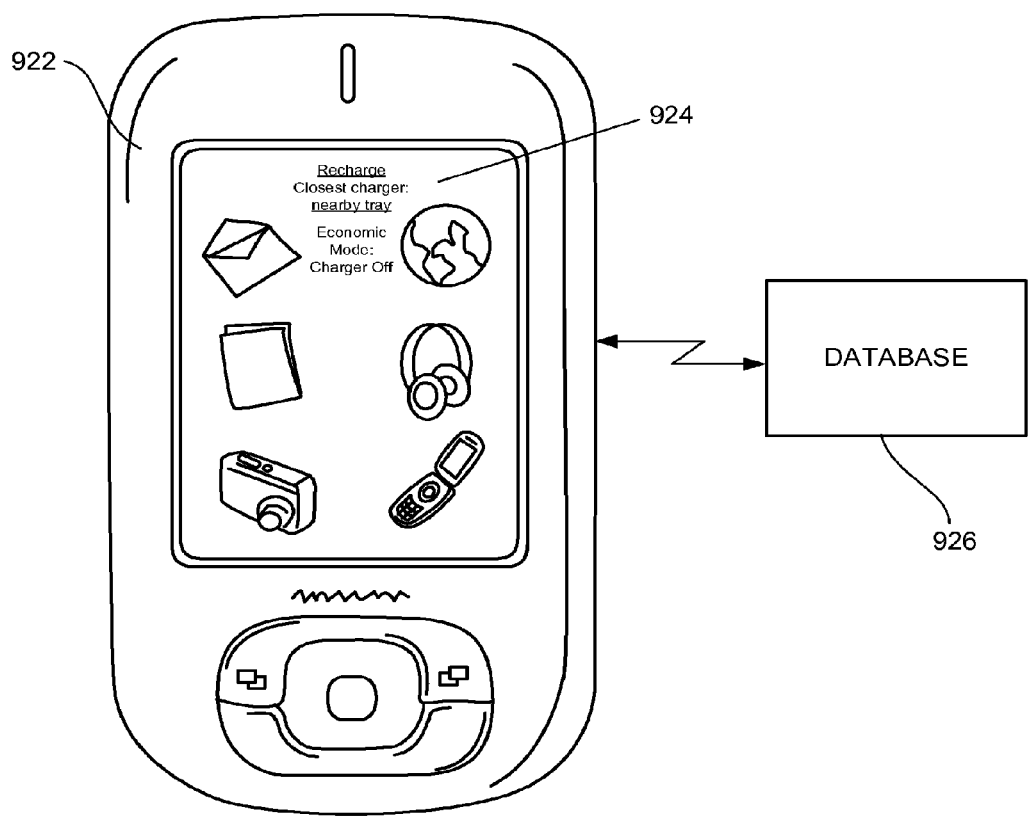
FIG. 9 illustrates a wirelessly chargeable electronic device according to an exemplary embodiment of the present invention.

FIG. 9 illustrates a wirelessly chargeable electronic device 922 according to an exemplary embodiment of the present invention. Device 922 may comprise any wirelessly chargeable electronic device such as, for example only, a cellular telephone, a portable media player, a camera, personal digital assistant, and the like, or any combination thereof. Device 922 may include an interface 924 and may be configured to convey a visible and/or an audible message to alert a device user. More specifically, device 922 may display the charging status of a nearby wireless charger, including the mode of operation the wireless charger is currently in. For example, a wireless charger may be set to be in an economy mode wherein the wireless charger is set to transmit wireless power to chargeable devices during a pre-determined time interval, such as during hours when off-peak energy rates apply. In this example, the status of the charger nearest device 922 is "off", or in other words, wireless power transmission is disabled. In economic mode displaying an "off" indicator and disabling wireless power transmission, indicates that the current time is outside of the appropriate pre-determined time interval further indicating that the current time is not one of the low energy rate periods.

A wireless charger may be set to operate in a different charging mode, such as a user programmable charging mode in which the user may determine a specified time interval when the wireless charger may transmit wireless power to chargeable devices. A user may make these determinations based on times when people may be asleep or otherwise away from the wireless charger, such as when the user is at work or the children are at school. These modes based on a user's schedule may reduce the human exposure to electromagnetic radiation. During transitions between status positions of a single charging mode (e.g. charger turns from on to off or vice versa), device 922 may display and/or convey an alert (e.g. a beep, or vibration of the device 922) to notify the user that an associated charger is now on or off depending on the prior status. During transitions from one mode to another (e.g. charger is switched from economy to a user programmed mode), device 922 may display and/or convey an alert (e.g. a beep, or vibration of the device 922) to notify the user which charging mode the associated charger is currently in.

Furthermore, in accordance with an exemplary embodiment of the present invention, device 922 may be configured to audibly convey and/or display information concerning one or more wireless chargers, which may be configured to wirelessly charge device 922. More specifically, in one exemplary embodiment, device 922 may be configured to display a map illustrating locations of one or more wireless chargers configured to wirelessly charge device 922. In another exemplary embodiment, device 922 may be configured to provide a location, via text and/or an audible message, of one or more wireless chargers configured to wirelessly charge device 922. Furthermore, in another exemplary embodiment, device 922 may be configured to audibly convey and/or display navigational directions to the one or more wireless chargers.

As a non-limiting example, device 922 may be configured to provide a user with a location of, and navigation directions to, one or more wireless chargers that are closest to device 922. As a more specific example, and, as illustrated in FIG. 9, device 922 may be configured to display the current mode (e.g. normal mode, economy mode, night mode, user-programmable mode, etc.) concerning a nearby wireless charger. Device 922 may be configured to obtain information concerning wireless charger locations via any known and suitable detection means and/or through a populated database 926. Device 922 may be configured to alter the modes of one or more wireless chargers, including setting a charging schedule or setting the parameters and times of operation for the user programmable modes for a specified charger.

Figure 10:
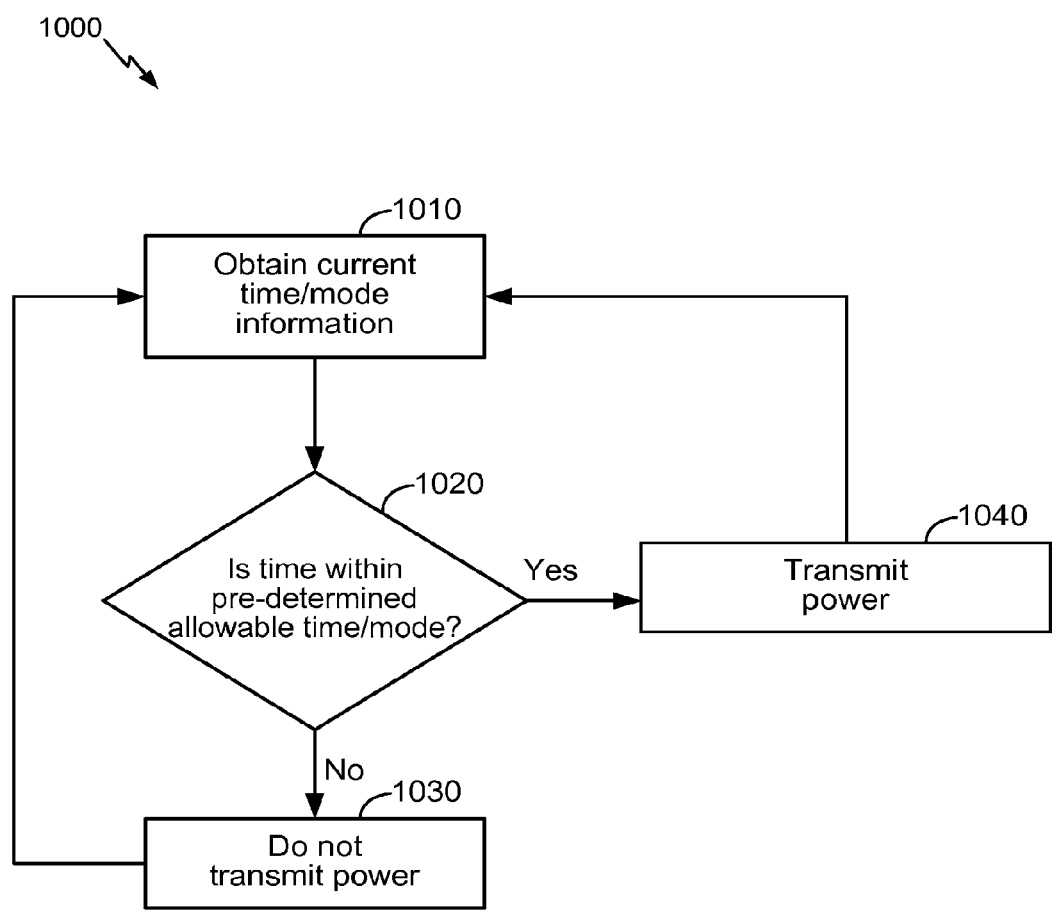
FIG. 10 illustrates a flow chart for a method for wirelessly charging an electronic device according to an exemplary embodiment of the present invention.

FIG. 10 illustrates a flow chart 1000 of a method for wirelessly charging an electronic device according to an exemplary embodiment of the present invention. Time information may be obtained 1010. Time information may be obtained from external devices, such as a time server, or an electronic device as previously discussed. Time information may be obtained by a charging device internally from an internal time source or oscillator. A determination 1020 is made whether the time information is within a pre-determined allowable time. Such a determination may be accomplished by determining the current charging mode that the charger is currently set to operate in, and the pre-determined time intervals associated with that mode for allowing and disallowing transmission of wireless power. Charging modes may be pre-defined, or user programmable as previously discussed.

If the current time is not within the pre-determined allowable time interval as defined by the current charging mode of the charging device, then the transmitter of charging device is disabled 1030, and wireless power is not transmitted to nearby electronic devices. If the current time is within the pre-determined allowable time interval as defined by the current charging mode of the charging device, then the transmitter of the charging device is enabled, and wireless power is transmitted 1040 to nearby electronic devices.

Several advantages exist from the present approach is embodiments of the present invention allow for more user control over the operation of the wireless charger. This added control may reduce energy costs for the charger's user by operating only when needed and/or when energy costs are cheapest or to limit human exposure to electromagnetic radiation. This additional control may also provide the user with the ability to determine a charging plan according to the user's preference and circumstances.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A wireless power charging device, comprising:
   a receiver configured to receive information from an electronic device, the information defining a parameter for charging the electronic device;
   a wireless power transmitter configured to wirelessly transmit power at a level sufficient to charge or power the electronic device;
   a processor configured to selectively enable the wireless power transmitter to wirelessly transmit power to the electronic device based at least in part on the parameter; and
   a display having an interface including an input region configured to permit a user to view and adjust a time interval or charging mode, the time interval or charging mode being defined at least in part on the parameter,
   wherein the information received from the electronic device comprises a charging schedule, the charging schedule defining the time interval or charging mode, wherein the charging schedule comprises a plurality of user-defined charging times.

2. The wireless power charging device of claim 1, wherein the charging schedule comprises the time interval or charging mode.

3. The wireless power charging device of claim 1, wherein the input region is configured to permit the user to select between a plurality of charging modes.

4. The wireless power charging device of claim 1, wherein the information comprises one of an identifier of the charging device or a charging status of the charging device.

5. The wireless power charging device of claim 1, wherein the interface is configured to provide information associated with charging the electronic device.

6. The wireless power charging device of claim 1, further comprising a load sensing circuit configured to detect the presence or absence of the electronic device.

7. The wireless power charging device of claim 6, further comprising a power amplifier, wherein the load sensing circuit monitors current flowing to the power amplifier.

8. The wireless power charging device of claim 7, wherein the processor is further configured to detect changes in loading on the power amplifier.

9. The wireless power charging device of claim 7, wherein the processor is configured to transmit to the electronic device during a first transmit phase or duty cycle and transmit to another wireless device during a second transmit phase or duty cycle.

10. The wireless power charging device of claim 9, wherein the processor is configured to detect changes to the loading on the power amplifier and enable wireless power transfer during the first or second transmit phases based at least in part on the detected changes.

11. The wireless power charging device of claim 1, wherein the processor is further configured to wirelessly transmit power to another wireless device.

12. The wireless power charging device of claim 1, wherein the interface comprises a light emitting diode.

13. The wireless power charging device of claim 1, wherein the electronic device is configured as at least one of a camera, a phone, an audio/video player, and a personal digital assistant.

14. A method of operating a charging device, the method comprising:
   receiving information from an electronic device, the information defining a parameter for charging the electronic device;
   displaying a time interval or charging mode on the charging device, the time interval or the charging mode being defined at least in part on the parameter;
   receiving user input on the charging device to adjust the displayed time interval or charging mode; and selectively enabling wireless power transmission to the electronic device during the adjusted time interval or charging mode, wherein receiving information comprises receiving a charging schedule within a data file, the charging schedule defining the time interval or charging mode, wherein the charging schedule comprises a plurality of user-defined charging times.

15. The method of claim 14, wherein selectively enabling wireless power transmission includes transmitting to the electronic device during a first transmit phase or duty cycle and transmitting to another wireless device during a second transmit phase or duty cycle.

16. The method of claim 15, further comprising:
detecting changes to loading on a power amplifier; and
enabling wireless power transfer during the first or second transmit phases based at least in part on the detected changes.

17. A wireless power charging device, comprising:
means for receiving information from an electronic device, the information defining a parameter for charging the electronic device;
means for displaying a time interval or charging mode on the charging device, the time interval or the charging mode being defined at least in part on the parameter;
means for receiving user input on the charging device to adjust the displayed time interval or charging mode; and
means for selectively enabling wireless power transmission to the electronic device during the adjusted time interval or charging mode,
wherein means for receiving information comprises receiving a charging schedule within a data file, the charging schedule defining the time interval or charging mode, wherein the charging schedule comprises a plurality of user-defined charging times.

* * * * *